US009571792B2

(12) United States Patent
Abou-Chakra et al.

(10) Patent No.: US 9,571,792 B2
(45) Date of Patent: Feb. 14, 2017

(54) METHOD FOR GENERATING AN IMMERSIVE VIDEO OF A PLURALITY OF PERSONS

(71) Applicant: Alcatel Lucent, Boulogne Billancourt (FR)

(72) Inventors: Rabih Abou-Chakra, Colombes (FR); Philippe Bletterie, Colombes (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/911,527

(22) PCT Filed: Jul. 10, 2014

(86) PCT No.: PCT/EP2014/064865
§ 371 (c)(1),
(2) Date: Feb. 11, 2016

(87) PCT Pub. No.: WO2015/022122
PCT Pub. Date: Feb. 19, 2015

(65) Prior Publication Data
US 2016/0191852 A1      Jun. 30, 2016

(30) Foreign Application Priority Data

Aug. 15, 2013 (EP) .................................... 13306152

(51) Int. Cl.
*H04N 7/15* (2006.01)
*H04N 7/08* (2006.01)

(52) U.S. Cl.
CPC ............ *H04N 7/152* (2013.01); *H04N 7/0806* (2013.01)

(58) Field of Classification Search
CPC ............ H04N 7/15; H04N 7/14; H04N 7/141; H04N 7/152; H04L 12/1813; H04L 29/06027
(Continued)

(56) References Cited

U.S. PATENT DOCUMENTS

2005/0140780 A1*   6/2005   Yang .................. H04L 12/1813
                                                             348/14.08
2006/0215765 A1    9/2006   Hwang et al.
(Continued)

FOREIGN PATENT DOCUMENTS

EP            2 288 104 A1      2/2011

OTHER PUBLICATIONS

International Search Report for PCT/EP2014/064865 dated Oct. 13, 2014.

*Primary Examiner* — Melur Ramakrishnaiah
(74) *Attorney, Agent, or Firm* — Fay Sharpe, LLP

(57) ABSTRACT

A method for interfacing a plurality of videoconferencing client devices the method comprising, in a computer server (5) connected to a client devices:—receiving a first client video stream (7) from the video routing client (4);—tagging a video image of the first client video stream received from the video routing client;—sending, through a bidirectional communication channel (14), the first client video stream (21) to a mixing client (2);—receiving, through the bidirectional communication channel with the mixing client, a mixed video stream (15) from said mixing client;—detecting in the mixed video stream received from the mixing client a video image portion which is different from the tagged video image of the first client video stream;—extracting the detected video image portion from the mixed video stream;—generating a second client video stream (23) from (Continued)

the extracted video image portion;—sending the second client video stream to the video routing client.

10 Claims, 3 Drawing Sheets

(58) Field of Classification Search
USPC .......................................... 348/14.01–14.16
See application file for complete search history.

(56) References Cited

U.S. PATENT DOCUMENTS

2006/0244819 A1   11/2006  Pun et al.
2006/0245379 A1* 11/2006  Abuan ................ H04L 12/1827
                                                                   370/261

* cited by examiner

METHOD FOR GENERATING AN IMMERSIVE VIDEO OF A PLURALITY OF PERSONS

FIELD OF THE INVENTION

The invention relates to a method of video processing in a multi-participant video-conferencing system.

BACKGROUND

Along with the increase of bandwidth capabilities in communication systems, video communication systems have become increasingly popular in both business and residential applications. Indeed, in the case of geographically distributed team collaboration, these systems avoid the travelling of the team collaborators and increase flexibility.

Videoconferencing technologies use video and audio communication to allow a plurality of people to communicate at a same time, for instance for meeting activities. Furthermore, besides the audio and visual transmission of meeting activities, videoconferencing technologies can be used to share documents and display information.

Each participant in a videoconference is filmed by a camera which generates a video stream representing the participant in his/her own environment. To create a video conference, two different technologies are generally used.

In a Video mixing based conference, all incoming video streams from N participants are combined by a Multiparty Conference Unit (MCU) in one mixed video stream. The mixed video stream includes the video streams of all the participants joined together. The mixed video stream is sent to the N participants.

As opposed to video mixing, video routing technology consists in having each participant send his own video stream to all other parties, which simultaneously decode up to 4 or 5 of them. Each video client device has thus to support receiving and decoding multiple flows.

SUMMARY

In an embodiment, the invention provides a method for interfacing a plurality of videoconferencing client devices comprising a video routing client and a video mixing client, wherein said mixing client comprises a Multiparty Conference Unit able to receive a plurality of client video streams and to generate a mixed video stream by mixing said plurality of client video streams, the method comprising, in a computer server connected to the client devices:

receiving a first client video stream from the video routing client;

tagging a video image of the first client video stream received from the video routing client;

sending, through a bidirectional communication channel, the tagged first client video stream to the mixing client;

receiving, through the bidirectional communication channel with the mixing client, a mixed video stream from said mixing client;

detecting in the mixed video stream received from the mixing client a video image portion which is different from a tagged video image of the tagged first client video stream;

extracting the detected video image portion from the mixed video stream;

generating a second client video stream from the extracted video image portion;

sending the second client video stream to the video routing client.

According to embodiments, such method may comprise one or more of the features below.

In an embodiment, the method further including the steps of receiving additional information data, wherein the additional information data is included in the first client video stream;

tagging the additional information data received from the video routing client;

sending the tagged additional information data to the mixing client;

detecting in the mixed video stream received from the mixing client additional information data which is different from the tagged additional information data;

extracting the metadata detected in the mixed video stream;

sending the extracted metadata in the second client video stream to the video routing client or to the video routing clients.

In an embodiment, the method further including the steps of:

Detecting that the video image portion that is different from the tagged client video image comprises a plurality of disjoint portions;

generating a plurality of second client video streams, each second client video stream corresponding to a different one of the disjoint portions;

sending the plurality of second client video streams to the video routing client.

In an embodiment, the client video stream received from the video routing client is carried on a bidirectional communication channel carrying a plurality of video streams in both directions.

In an embodiment, the tagging step includes a step of adding a frame around the video image of the first client video stream received from the video routing client.

In an embodiment, the tagging step includes a step of adding a transparent layer on the video stream received from the video routing client.

In an embodiment, the method further comprises the steps of:

receiving a plurality of first client video stream from a plurality of video routing clients;

tagging each first client video stream received from the plurality of video routing clients;

sending, through a plurality of bidirectional communication channels, each tagged first client video stream to the mixing client;

detecting in the mixed video stream received from the mixing client the video image portion which is different from each of the plurality of tagged first client video streams.

In an embodiment, the method further includes the steps of:

receiving a plurality of additional information data from a plurality of first video routing client;

tagging the plurality of additional information data received from the plurality of first video routing client.

In an embodiment, the invention also provides a video processing server for interfacing a plurality of videoconferencing clients devices comprising a video routing client and a video mixing client, wherein said mixing client comprises a Multiparty Conference Unit able to receive a plurality of client video streams to generate a mixed video stream by mixing said plurality of client video streams, the video processing sever including:

a router able to
  receive a first client video stream from a video routing client device,
  Send to the video routing client a second client video stream generated from a video image portion extracted from mixed video stream received from the mixing client;
a tagging agent block able to mark the first client video stream received from the video routing clients,
a communication block able to
  send, in a bidirectional communication channels carrying the tagged first client video stream to the mixing client, and to
  receive a mixed video stream generated by the mixing client including tagged first client video stream sent to said mixing client;
a tag detector block able to
  detect a video image portion of the mixed video stream received from the mixing client which is different from the tagged first client video stream,
  extract the detected image portion in the mixed video stream received from the mixing client.

In other embodiments, the first client video stream from the video routing client and the second video stream sent to the video routing client are carried on a bidirectional communication channel established between the server and the video routing client.

In an embodiment, the invention also provides a computer program comprising computer-executable instructions that perform the above-mentioned method when executed, and a computer that comprises said computer program.

The invention originates from the observation that, despite of an installed base market dominated by mixing compatible video systems, a significant part of them embedding an up to four ports MCU, multiparty video conferencing is shifting from mixing to video routing technology. An idea on which the invention is based is to include such a video mixing based system in routed multiparty video sessions, in which multiple video flows, sometimes including a presentation sharing data, are exchanged among all parties.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
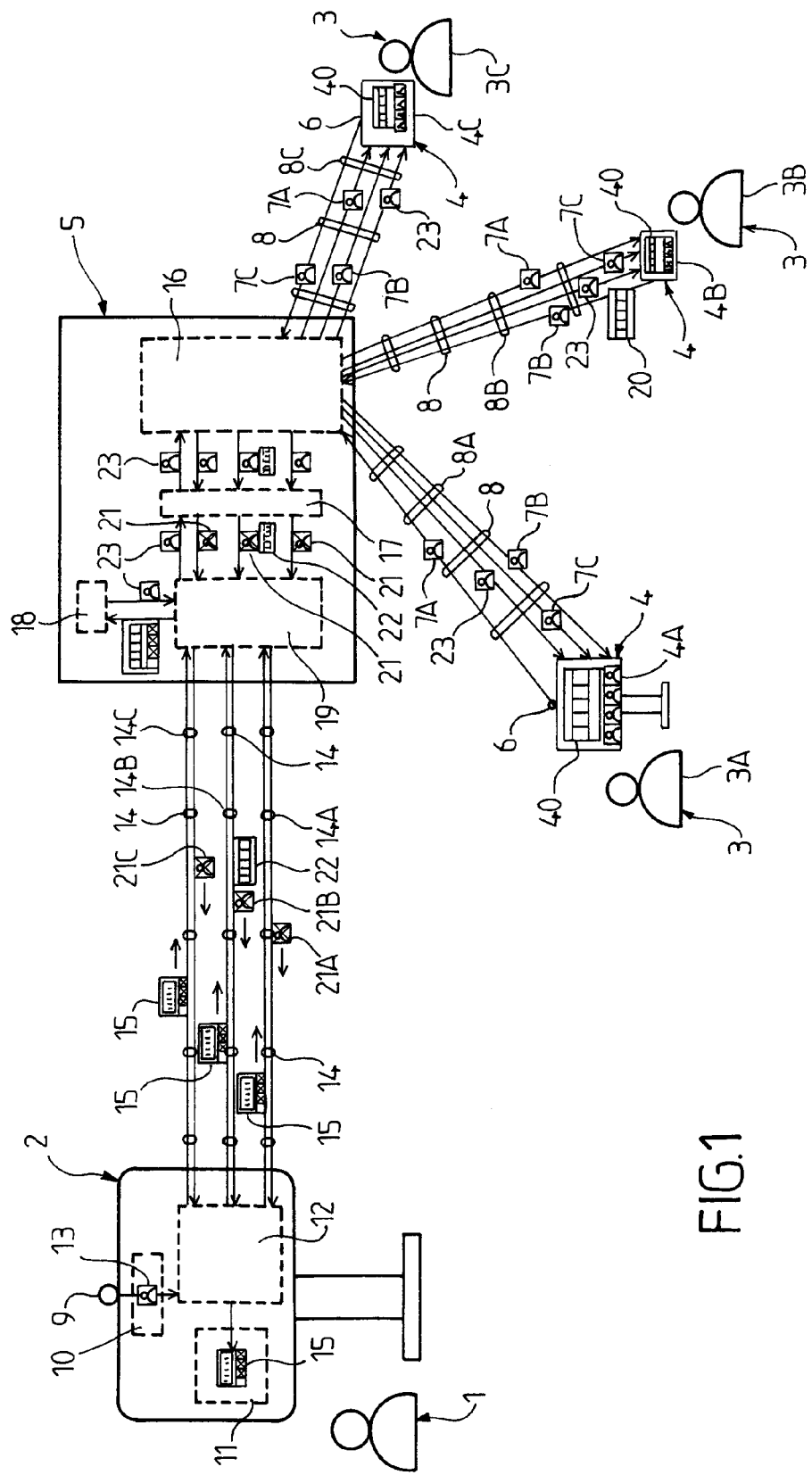
FIG. 1 illustrates functionally an embodiment of a video conferencing system architecture in the case wherein three video routing clients are participating in a video conference with a mixing client comprising an integrated capture device.

FIG. 1 illustrates an embodiment of a video conferencing system architecture in the case wherein four persons are participating in a video conference.

In FIG. 1, a mixing participant 1 uses a mixing client device 2. Three video routing participants 3 use each one a video routing client device 4. Mixing client device 2 and video routing client devices are connected to a Mixing Compatible Video Routing Server 5 (MCVRS). Each client device may be for instance a personal computer, a mobile phone, a tablet or any other device. The participants, and their respective client devices, are located in different places and have a video conference together.

Each video routing client device 4 has a capture device 6. The capture device 6 is, for instance, a camera 6 which captures a video stream 7 of its routing participant 3 in his/her own environment. Each video routing client device 4 has a communication port able to establish a bidirectional communication channel 8 with the MCVRS 5. Such a communication channel 8, established between the video routing client device 4 and the MCVRS 5, is able to carry a plurality of video streams in both directions. In use, the video routing client device 4 sends its captured video stream 7 to the MCVRS 5 and receives video streams corresponding to the video streams captured by other participants. Video routing client device 4 is able to mix its own captured video stream and received video streams carried on the communication channels 8 in a mixed video stream. An image of such mixed video stream includes the simultaneous images of all the video streams joined together (see FIG. 2).

The mixing client 2 comprises a capture device 9, an encoder block 10, a decoder block 11 and an embedded MCU 12. The capture device 9 is, for instance, a camera 9 which captures a video stream 13 of the mixing participant 1 in his/her environment. The encoder block 10 encodes the captured video stream 13 and transmits it to the MCU 12.

The MCU 12 has a plurality of communication ports. Each port of the MCU 12 permits to establish a communication channel 14 between the mixing client device 2 and the MCVRS 5. Each communication channel 14 established between the MCU 12 and the MCVRS 5 is a bidirectional channel able to carry one video stream, and optionally a further data stream, in both directions. The MCU 12 mixes the video stream captured by the capture device 9 of the mixing client device 2 and the received video streams carried on the communication channels 14 into a mixed video stream 15. An image of such a mixed video stream 15 includes the simultaneous images of all the video streams used to generate the mixed video stream 15 joined together. The mixed video stream 15 is sent to the decoder block 11. The mixed video stream 15 is also sent in the established communication channel 14 to the MCVRS 5.

The decoder block 11 decodes the mixed video stream 15. The decoded video stream is displayed on a display device of the mixing client device 2, for instance a computer screen or a TV.

If the mixing client device 2 were merely connected to a video routing client 4 device, the video routing client device 4 would send to the mixing client device 2 its captured video stream, then the mixing client device 2 would include the video stream received from the video routing client device 4 in a mixed video stream and the mixing client device 2 would send back the mixed video stream to the video routing client device 4. The video routing client device 4 would then generate a mixed video stream including its own captured video stream and the mixed video stream received from the mixing client device 2. Such a mixed video stream generated by the video routing client device 4 would include the video routing client device captured video stream two times, once from its own captured video stream and once from the mixed video stream from the mixing client device 2.

To avoid this in the video conferencing system represented in FIG. 1, the MCVRS 5 includes a router 16, a tagging block 17, a tag detection block 18 and a communication agent block 19.

The router 16 has a plurality of ports able to establish bidirectional communication channels 8 with the video routing client devices 4. Each established bidirectional communication channel 8 established can carry a plurality of video streams in both directions. In fact, router 16 receives a respective video stream, and optionally data, from each video routing client device 4 and sends it back to all other video routing client devices 4. The router 16 also sends the video streams received from every video routing client 4 to the tagging agent block 17.

The tagging agent block 17 performs the tagging of the video images. Tagging can be any marking technology, and can range from sophisticated transparent technology, to simple addition of a signed/specific frame around each image of the video stream. When the incoming video stream includes additional information data 20, e.g documents to be shared by the participants, the additional data 20 is also tagged. The tagging agent block 17 sends each tagged video stream to the communication agent block 19.

The communication agent block 19 establishes as many communication channels 14 as needed with the MCU 12 embedded in the mixing client device 2, i.e one bidirectional channel 14 per video routing client device 4, with a maximum depending on the MCU 12 capability. Each communication channel 14 between the communication agent block 19 and the MCU 12 carries one video stream, and optionally a further data stream, in both directions. The communication agent block 19 sends the tagged video streams 21, and optionally tagged additional information data 22, to the MCU 12. The tagged video streams 21 sent by the communication agent block 19 to the MCU 12 are the ones received from the tagging agent block 17. The Communication agent block 19 receives from the MCU 12 the mixed video stream 15 generated by the MCU 12. The communication agent block 19 transmits mixed video stream 15 to the Tag detector block 18.

The tag detector block 18 is able to detect which parts of each image in the mixed video stream correspond to images previously tagged by the tagging agent block 17. The Tag detector block 18 receives the mixed video stream 15 from the communication agent block 19. Tag detector block 18 detects the tagged areas in each image of the mixed video stream 15. Once tagged areas have been identified in an image of the mixed video stream 15, the tag agent block 18 cuts-out the non-tagged areas from the image of the mixed video stream 15. The cut-out portion or portions is used to generate a new image corresponding to an image captured by the capture device 9 included in the mixing device 2. An extracted video stream 23 is generated with the cut-out portion or portions of the mixed video stream 15. Said extracted video stream 23 is sent back to the communication agent block 19.

The tag detector block 18 generates a video stream corresponding to each disjoined portion of the mixed video stream 15 which has not been tagged by the tagging agent block 17. If the tag detector block 18 detects only one non-tagged area in the images of the mixed video stream 15, the tag detector block generates only one extracted video stream 23. If the tag detector block 18 detects a plurality of disjoined non-tagged areas in the images of the mixed video stream 15, the tag detector block 18 generates one extracted video stream 23 for each detected non-tagged portion of the image.

Figure 2:
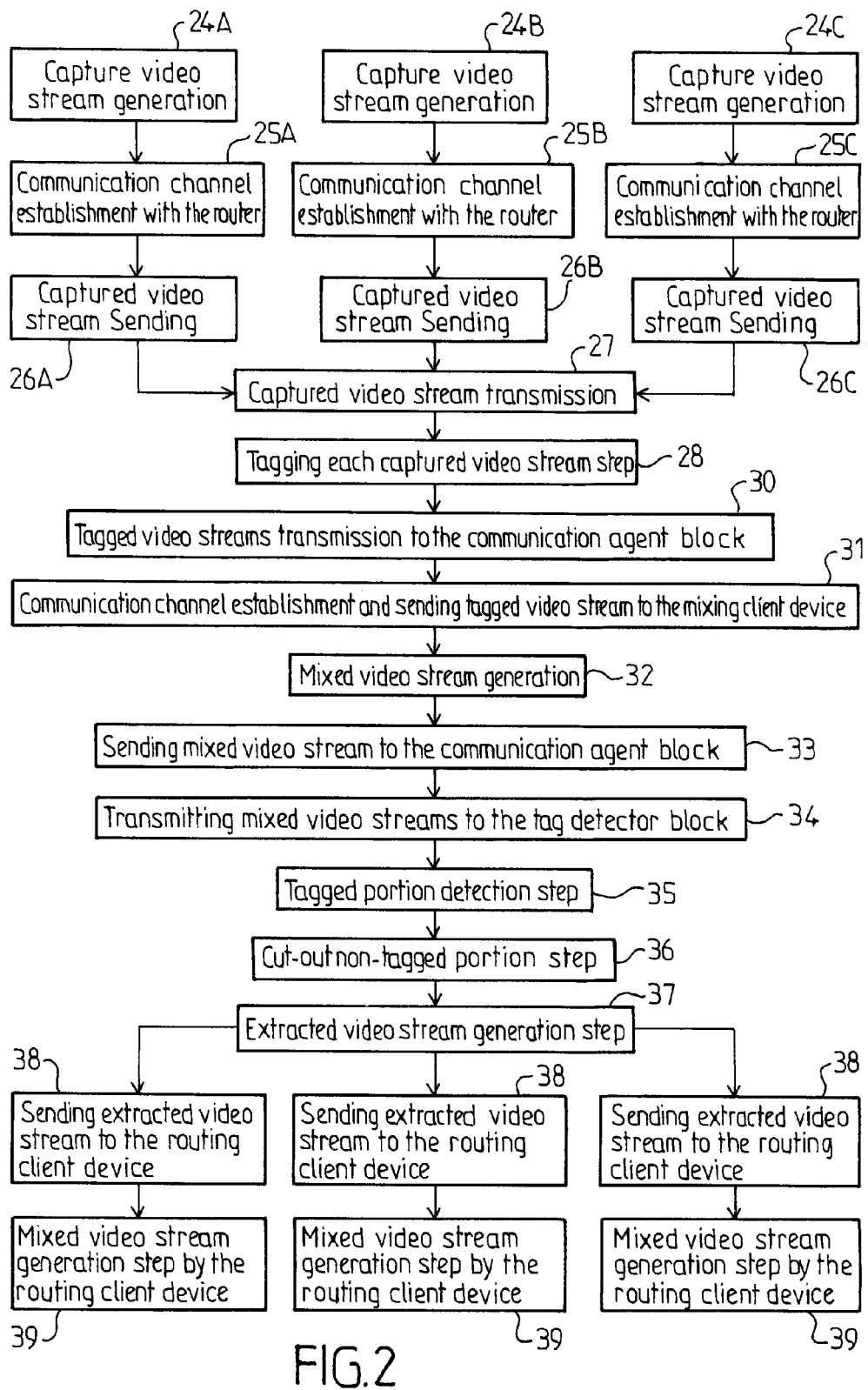
FIG. 2 is a diagram representing the steps performed by a server in a system of FIG. 1.

FIG. 2 is a diagram representing the steps performed during a video conference in a system of FIG. 1.

In this system, a first video routing participant 3A has a personal computer 4A as video routing client device 4, a second video routing participant 3B has a smartphone 4B as video routing client device 4 and a third video routing participant 3C has a tablet 4C as video routing client device 4 (see FIG. 1).

As explained above, each video routing client device 4 generates (steps 24A, 24B and 24C) a captured video stream 7 representing its participant in his/her own environment. Each video routing device 4 establishes a bidirectional communication channel 8 with the router 16 of the MCVRS 5 (steps 25A, 25B and 25C). The captured video stream 7 of each video routing client 4 device is send (step 26A, 26B and 26C) to the router 16 via the established communication channel 8. The router 16 sends (step 27) each captured video stream 7 from the video routing devices 4 to the other video routing client devices 4 and to the tagging agent block 17. Typically, as shown in FIG. 1, a first captured video stream 7A from the first video routing client 4A is sent to the second video routing client device 4B, to the third client device 4C and to the tagging agent block 17. A second captured video stream 7B, from the second video routing client device 4B and including data 20, is sent to the first client video routing device 7A, to the third video routing client device 4C and to the tagging agent block 17. A third captured video stream from the third video routing client device 4C is sent to the first video routing client device 4A, to the second video routing client device 4B and to the tagging agent block 17.

Each captured video stream 7 is tagged by the tagging agent block 17 (step 28). As the capture video stream 7B of the second video routing client device includes additional information data 20, the tagging agent block 17 tags also said additional information data 20. The tagging agent block 17 adds a red frame 29 (see FIGS. 3A and 3B) around each image of the captured video streams 7. The tagging agent block 17 sends the tagged video streams 21, including tagged additional information data 22, to the communication agent block 19 (step 30). As the MCU 12 in the mixing client device 2 supports communication channels 14 carrying only one video stream, and optionally a further data stream, in both direction, the communication agent block 19 establishes a bidirectional communication channel 14 with the MCU 12 for each tagged video stream 21 (step 31). As shown in FIG. 1, a first communication channel 14A carries a first tagged video stream 21A, a second communication channel 14B carries a second tagged video stream 21B including tagged additional information data 22 And a third communication channel 14C carries a third tagged video stream 21C.

The MCU 12 generates the mixed video stream 15 with the tagged video streams 21 and its own captured video stream 13 (step 32). The mixed video stream 15 includes the three tagged video streams 21 and the captured video stream 13 from the mixing client device 2 joined together. A display device of the mixing device 2 displays the mixed video stream 15. The MCU 12 sends the mixed video stream 15 on the three already established bidirectional communication channels 14 (step 33).

The communication agent block 19 receives the mixed video stream 15. The communication agent block 19 transmits the mixed video stream 15 to the tag detector block 18 (step 34).

The tag detector block 18 analyses each image of the mixed video streams 15. More specifically, the tag detector block 18 analyses each image of the mixed video stream 15 to detect each portions of the image which comprises a tag as added by the tagging agent block 17 (step 35). During this step, the tagging agent detects all portions which are surrounded by a red frame. The images of the three tagged video stream 21 and the tagged additional information data 22 are detected by the tag detector block 18. Then, the tag detector block 18 cuts-out portion of the images which have not been detected as tagged by the tagging agent block 17 (step 36). As an image of the mixed video stream 15 includes three tagged images and tagged additional information data 22 joined together, only one portion of such image is cut-out as having not been tagged by the tagging agent block 17. Such cut-out image corresponds to an image of the captured video stream 13 from the mixing client device 2. The tag detector block 18 generates the extracted video stream 23 with the cut-out images of the mixed video stream 15 (step 37). The tag detector block sends said extracted video stream 23 to the communication agent block 19 which transmits it to the tagging agent block 17. The tagging agent block 17 then transmits to the router 16 the extracted video stream 23. The router 16 uses the established communication channels 8 to send the extracted video stream 23 to each video routing client 4 (step 38).

Each video routing client generates a mixed video stream 40 with the captured video stream from its own capture device 2 (step 39), the capture video streams from the other video routing client devices and the extracted video stream 23 of the mixed video stream 15. A mixed video stream 40 generated by each video routing client device 4 (see FIG. 1) is similar to the mixed video stream 15 generated by the mixing client, each one representing all the participants 1 and 3 joined in a same mixed video stream 15 or 40.

Figure 3A:
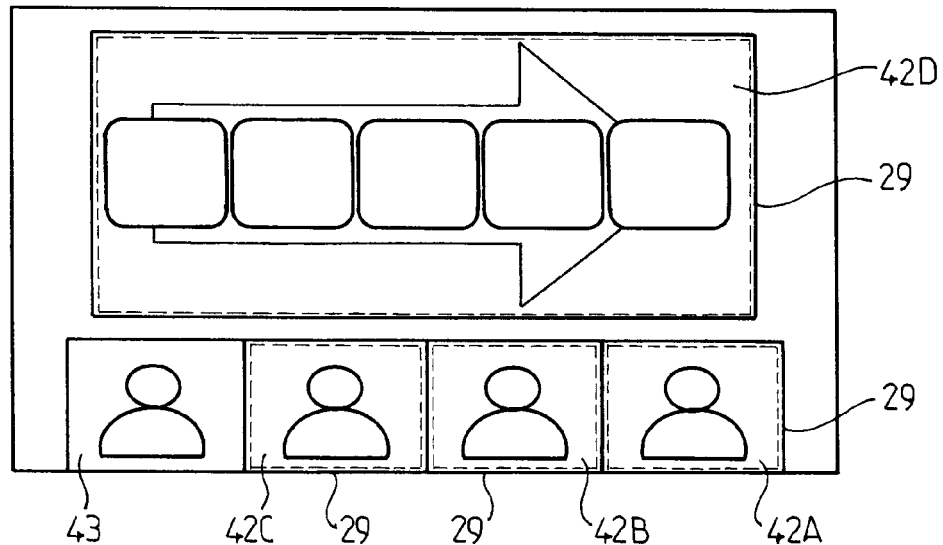
FIG. 3A is a schematically representation of an image of a mixed video stream generated by the mixing client of FIG. 1.

FIG. 3A is an image from a mixed video stream including tagged portions during a conference using the system of FIG. 1.

An image 41 from a mixed video stream as represented in FIG. 3A includes a first tagged image portion 42A representing a first video routing participant 3A, a second tagged image portion 42B representing a second video routing participant 3B, a third image portion 42C representing a third video routing participant 3C and a fourth portion 42D representing the tagged additional information data 22. The image 41 also includes a mixing portion 43 representing mixing participant 1.

During its analyses, the tag detector block 18 detects the red frame 29 around the tagged portions 42. As these tagged portions 42 have been detected, the tag detector block 18 cuts-out the non-tagged portion of the image. Typically, the tag detector block 18 cuts-out the mixing portion 43. The tag detector block 18 extracts an image corresponding to the mixing portion 43 and integrates the extracted image to an extracted video stream representing the mixing participant.

Figure 3B:
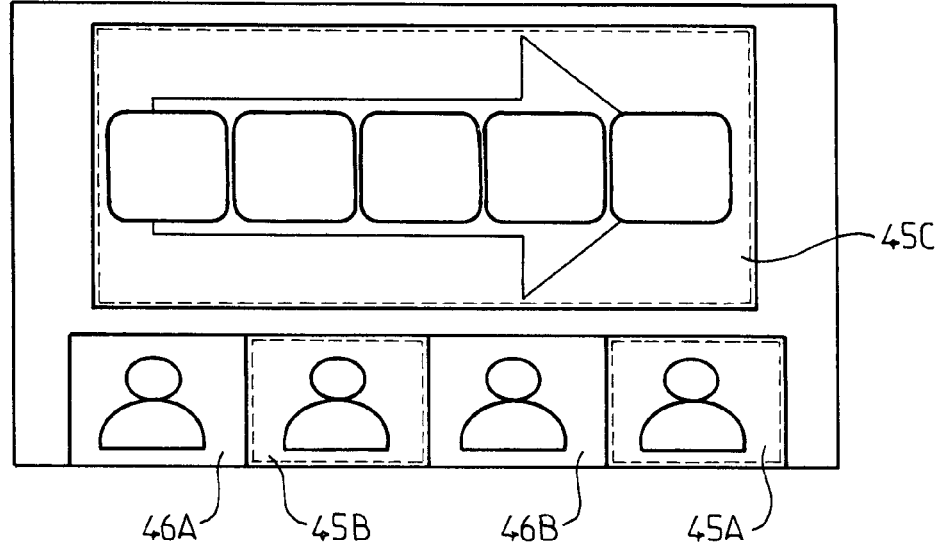
FIG. 3B is a schematically representation of an image of a mixed video stream generated by a mixing client having two different capture devices directly connected to the MCU.

FIG. 3B is an image from a mixed video stream including tagged portions and disjoint non-tagged portions during a conference.

An image 44 from a mixed video stream as represented in FIG. 3B includes a first tagged image portion 45A representing a first video routing participant and a second tagged image portion 45B representing a second video routing participant and a tagged additional information portion 45C. The image 44 also includes a first mixing portion 46A and a second mixing portion 46B, each one representing a respectively a first and a second mixing participant.

During its analyses, the tag detector block 18 detects the tagged portions 45. As these tagged portions 45 have been detected, the tag detector block 18 cuts-out the non-tagged portions 46 of the image 44. Typically, the tag detector block 18 cuts-out the first mixing portion 46A and the second mixing portion 46B. The tag detector block 18 detects that these two non-tagged portions are disjoint in the image 44, the first mixing portion 46A being separated from the second mixing portion 46B by the first video routing portion 45B. As two disjoint portions of the image are detected as being not tagged, the tag detector block 18 generates two different images corresponding respectively to the first mixing portion 46A and to the second mixing portion 46B. These two images are integrated to two different extracted video streams 23, each one representing respectively the first and the second mixing participant.

In an embodiment, the mixed video stream 15 generated by the mixing client 2 includes additional information data which is not tagged, e.g which is not included in a captured video stream from a video routing client device. Such additional information data is detected by the tag detector block 18 as being non-tagged and then cut-out and inserted in the extracted video stream.

To tag an item in a video stream, marks may be inserted in one image or in each image or in every N images of the video stream. In an embodiment, the mark used by the tagging agent block is a red frame added around the first image of a video stream. When the tag detector block detects in the first image of a video stream such a red frame, the tag detector considers that the tagged portion in the first image is also a tagged portion in the following images. In another embodiment, only one image every N images, with for instance N=10, of a video stream is tagged, each tagged portion being defined for the tagged image of a video stream and the N following images.

The invention is not limited to the described embodiments. The appended claims are to be construed as embodying all modification and alternative constructions that may be occurred to one skilled in the art, which fairly fall within the basic teaching here, set forth. The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The invention may be implemented by means of hardware as well as software. The same item of hardware may represent several "means".

The invention claimed is:

1. A method for interfacing a plurality of videoconferencing client devices comprising a video routing client and a video mixing client, wherein said mixing client comprises a Multiparty Conference Unit able to receive a plurality of client video streams and to generate a mixed video stream by mixing said plurality of client video streams the method comprising, in a computer server connected to the client devices:

receiving a first client video stream from the video routing client;

tagging a video image of the first client video stream received from the video routing client, sending, through a bidirectional communication channel, the first client video stream to the mixing client, receiving, through the bidirectional communication channel with the mixing client, a mixed video stream from said mixing client, detecting in the mixed video stream received from the mixing client a video image portion which is different from the tagged video image of the first client video stream, extracting the detected video image portion from the mixed video stream, generating a second client video stream from the extracted video image portion;

sending the second client video stream to the video routing client.

2. A method according to claim 1, the method further including:

receiving additional information data, wherein the additional information data is included in the first client video stream;

tagging the additional information data received from the video routing client;

sending the tagged additional information data to the mixing client, detecting in the mixed video stream received from the mixing client additional information data which is different from the tagged additional information data, extracting the additional information data detected in the mixed video stream, sending the extracted additional information data in the second client video stream to the video routing client or to the video routing clients.

3. A method according to claim 1, the method further including:

Detecting that the video image portion that is different from the tagged client video image comprises a plurality of disjoint portions;

generating a plurality of second client video streams, each second client video stream corresponding to a different one of the disjoint portions;

sending the plurality of second client video streams to the video routing client.

4. A method according to claim 1, wherein the client video stream received from the video routing client is carried on a bidirectional communication channel carrying a plurality of video streams in both directions.

5. A method according to claim 1, wherein the tagging includes adding a frame around the video image of the first client video stream received from the video routing client.

6. A method according to claim 1, wherein the tagging includes adding a transparent layer on the video stream received from the video routing client.

7. A method according to claim 1, wherein the method further comprises:

receiving a plurality of first client video streams from a plurality of video routing clients;

tagging each first client video stream received from the plurality of video routing clients;

sending, through a plurality of bidirectional communication channels, each tagged first client video stream to the mixing client, detecting in the mixed video stream received from the mixing client the video image portion which is different from each of the plurality of tagged first client video streams.

8. A method according to claim 7, wherein the method further includes:

receiving a plurality of additional information data from a plurality of first video routing client;

tagging the plurality of additional information data received from the plurality of first video routing client.

9. A video processing server for interfacing a plurality of videoconferencing clients devices comprising a video routing client and a video mixing client, wherein said mixing client comprises a Multiparty Conference Unit able to receive a plurality of client video streams to generate a mixed video stream by mixing said plurality of client video streams, the video processing server including:

a router able to receive a first client video stream from the video routing client device, Send to the video routing client a second client video stream generated from a video image portion extracted from a mixed video stream received from the mixing client;

a tagging agent block able to mark the first client video stream received from the video routing client, a communication block able to send in a bidirectional communication channel the tagged first client video stream to the mixing client, and to receive a mixed video stream generated by the mixing client including tagged first client video stream sent to said mixing client;

a tag detector block able to detect a video image portion of the mixed video stream received from the mixing client which is different from the tagged first client video stream, and extract the detected image portion in the mixed video stream received from the mixing client.

10. The Video processing server according to claim 9, wherein the first client video stream from the video routing client and the second client video stream sent to the video routing client are carried on a bidirectional communication channel established between the server and the video routing client.

* * * * *